United States Patent
Nakamoto

(10) Patent No.: US 12,451,520 B2
(45) Date of Patent: Oct. 21, 2025

(54) ELECTROLYTIC SOLUTION AND FLUORIDE ION BATTERY

(71) Applicant: TOYOTA JIDOSHA KABUSHIKI KAISHA, Toyota Aichi-ken (JP)

(72) Inventor: Hirofumi Nakamoto, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 646 days.

(21) Appl. No.: 17/854,941

(22) Filed: Jun. 30, 2022

(65) Prior Publication Data
US 2023/0028385 A1      Jan. 26, 2023

(30) Foreign Application Priority Data
Jul. 8, 2021   (JP) .................. 2021-113290

(51) Int. Cl.
  *H01M 10/0569*  (2010.01)
  *H01M 10/054*   (2010.01)
  *H01M 10/0567*  (2010.01)
  *H01M 10/0568*  (2010.01)
  *H01M 4/58*     (2010.01)

(52) U.S. Cl.
  CPC ..... *H01M 10/0569* (2013.01); *H01M 10/054* (2013.01); *H01M 10/0567* (2013.01); *H01M 10/0568* (2013.01); *H01M 4/582* (2013.01); *H01M 2300/0028* (2013.01)

(58) Field of Classification Search
  CPC ......... H01M 10/0567; H01M 10/0568; H01M 10/0569; H01M 2300/0028; H01M 10/054; H01M 4/582
  See application file for complete search history.

(56) References Cited

U.S. PATENT DOCUMENTS

| | | | |
|---|---|---|---|
| 9,954,246  B2* | 4/2018  | Nakamoto | H01M 10/0569 |
| 9,991,560  B2* | 6/2018  | Nakamoto | H01M 10/0569 |
| 11,489,200 B2* | 11/2022 | Nakamoto | H01M 10/0568 |
| 2016/0087308 A1 | 3/2016 | Nakamoto et al. | |
| 2016/0204471 A1* | 7/2016 | Nakamoto | H01M 10/0568 429/200 |
| 2020/0321654 A1 | 10/2020 | Nakamoto et al. | |
| 2021/0057795 A1* | 2/2021 | Bi | H01M 4/483 |

FOREIGN PATENT DOCUMENTS

| | | |
|---|---|---|
| JP | 2016-062821 A | 4/2016 |
| JP | 2020-170656 A | 10/2020 |

OTHER PUBLICATIONS

Ritambhara Gond et al. "Non-flammable liquid electrolytes for safe batteries"; Mater. Horiz., 2021,8, 2913-2928. Received May 9, 2021, Accepted Sep. 15, 2021; First published on Sep. 16, 2021.*
Wang, J., Yamada, Y., Sodeyama, K. et al. Fire-extinguishing organic electrolytes for safe batteries. Nat Energy 3, 22-29 (2018). https://doi.org/10.1038/s41560-017-0033-8.*

* cited by examiner

*Primary Examiner* — Laura Weiner
(74) *Attorney, Agent, or Firm* — Dinsmore & Shohl LLP

(57) ABSTRACT

The present disclosure provides an electrolytic solution having high reduction stability. An electrolytic solution, wherein the electrolytic solution is used in a fluoride ion battery, and the electrolytic solution includes a Li salt, a F salt, and a trialkyl phosphate.

12 Claims, 3 Drawing Sheets

ELECTROLYTIC SOLUTION AND FLUORIDE ION BATTERY

CROSS-REFERENCE TO RELATED APPLICATIONS

This application is based upon and claims the benefit of priority of the prior Japanese Patent Application No. 2021-113290 filed Jul. 8, 2021, the entire contents of which are incorporated herein by reference.

TECHNICAL FIELD

The present disclosure relates to an electrolytic solution and a fluoride ion battery.

BACKGROUND

As a high-voltage and high-energy-density battery, for example, Li-ion battery is known. Li-ion battery is a cation-based battery utilizing the reaction of Li-ions. On the other hand, as an anionic-based battery, a fluoride ion battery utilizing a reaction of fluoride ions is known.

For example, Patent Literature 1 discloses an electrolytic solution used in a fluoride ion battery. Specifically, Patent Literature 1 discloses an electrolytic solution containing a potassium fluoride, an alkali metal amide salt, and glyme.

Patent Document

Patent Document 1: Japanese Patent Application Laid-Open No. 2020-170656

SUMMARY

Technical Problem

In some embodiments, the reduction stability of the electrolytic solution is high. The reason is as follows. In other words, even when, for example, an anode active material having a lower reaction potential is used, reduction decomposition of the electrolytic solution is suppressed. It is a primary object of the present disclosure: to provide an electrolytic solution having high reduction stability.

Solution to the Problem

[1]
An electrolytic solution, wherein the electrolytic solution is used in a fluoride ion battery, and the electrolytic solution includes an Li salt, a F salt, and a trialkyl phosphate.

[2]
The electrolytic solution according to [1], wherein the trialkyl phosphate is represented by the following general formula, and "p", "q" and "r" in the general formula are each an integer of 1 or more and 10 or less.

[Formula 1]

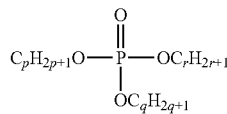

[3]
The electrolytic solution according to [1] or [2], wherein the Li salt contains an organic anion.

[4]
The electrolytic solution according to [3], wherein the organic anion is an amide anion.

[5]
The electrolytic solution according to any one of [1] to [4], wherein the F salt contains an inorganic cation.

[6]
The electrolytic solution according to [5], wherein the inorganic cation is a cation of an alkali metal.

[7]
The electrolytic solution according to any one of [1] to [6], wherein the electrolytic solution contains glyme.

[8]
A fluoride ion battery comprising a cathode active material layer, an anode active material layer, and an electrolyte layer formed between the cathode active material layer and the anode active material layer, wherein the electrolyte layer contains the electrolytic solution according to any one of [1] to [7]

Effect

The electrolytic solution in the present disclosure has high reduction stability.

DETAILED DESCRIPTION

Figure 1:
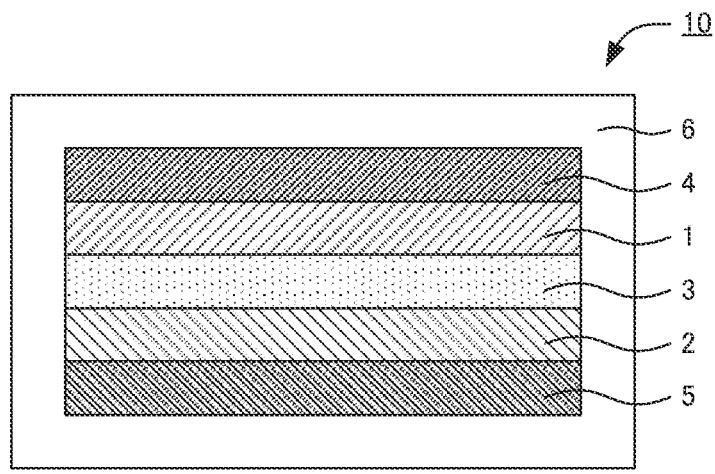
FIG. 1 is a schematic cross-sectional view illustrating a fluoride ion battery according to the present disclosure.

The electrolytic solution and the fluoride ion battery in the present disclosure are described in detail below.

<Electrolytic Solution>

The electrolytic solution in the present disclosure is used for a fluoride ion battery. The electrolytic solution in the present disclosure includes an Li salt, a F salt and a trialkyl phosphate.

Since the electrolytic solution in the present disclosure contains an Li salt, a F salt and a trialkyl phosphate, reduction stability is good. As described above, in some embodiments, the reduction stability of the electrolytic solution may be high. The reason is as follows. In other words, even when, for example, an anode active material having a lower reaction potential is used, reduction decomposition of the electrolytic solution is suppressed. As a result, a high energy density fluoride ion battery is obtained. Anode active materials having lower reactive potentials include, for example, Mg and Al.

The inventor has been researching on an electrolytic solution having a Li salt and a F salt. In particular, when KF is used as a F salt, the inventor has discovered that an active fluoride ion concentration in an electrolytic solution is high. On the other hand, in an electrolytic solution having an Li salt and a F salt, improvement in reduction stability is desired. In the present disclosure, by adding trialkyl phosphate to the electrolytic solution, the reduction stability of the electrolytic solution was improved. The reason is presumed to be as follows. That is, in an electrolytic solution having an Li salt and a F salt, the activity of Li ions (Li+) is usually higher than that of F ions (F−). Therefore, when the potential becomes low, side reactions derived from the Li salt occur, and as a result, the reduction stability decreases. On the other hand, by adding trialkyl phosphate to the electrolytic solution, the activity of Li+ is suppressed. In the examples described below, the activity of Li+ is lower than that of F−. Therefore, even if the potential becomes low, side reactions derived from the Li salt are suppressed, and as a result, the reduction stability is improved.

1. Li Salt

The Li salt in the present disclosure contains at least Li+ as a cationic component. The Li salt may contain only Li+ as a cationic component. On the other hand, the Li salt may contain a cationic component other than Li+. In some embodiments, the Li salt contains Li+ as a main component of the cationic component. The ratio of Li+ to all cationic components in the Li salt is, for example, 50 mol % or more, and may be 70 mol % or more, and may be 90 mol % or more.

The Li salt has an anionic component. The Li salt has, for example, an organic anion as an anionic component. Organic anions are anions with carbon (C) or nitrogen (N). Examples of the organic anion include an amide anion. The amide anion has a structure in which a proton is abstracted from a secondary amine. Examples of the amide anion include a sulfonylamide anion and a silylamide anion.

The sulfonylamide anion is an anion in which N (anion center) in an amide anion and S of a sulfonyl group are bonded. The sulfonylamide anion has, for example, one sulfonyl group. In addition, the sulfonylamide anion has, for example, 2 sulfonyl groups. In some embodiments, the sulfonyl group may be bonded to an alkyl group, a fluoroalkyl group or fluorine. The number of carbon atoms of the alkyl group is, for example, 4 or less. The number of carbon atoms of the fluoroalkyl group is, for example, 4 or less. Examples of the sulfonylamide anion include a bisfluorosulfonylamide (FSA) anion and a bistrifluoromethanesulfonylamide (TFSA) anion.

The silylamide anion is an anion in which N (anion center) in an amide anion and Si of a silyl group are bonded. The silylamide anion has, for example, one silyl group. The silylamide anion has, for example, two silyl groups. In some embodiments, the silyl group may be bonded to an alkyl group, a fluoroalkyl group or fluorine. The number of carbon atoms of the alkyl group is, for example, 4 or less. The number of carbon atoms of the fluoroalkyl group is, for example, 4 or less. Examples of the silylamide anion include a bistrimethylsilylamide (TMSA) anion, a bistrifluoromethylsilylamide anion, a bistrifluorosilylamide anion, a bistriethylsilylamide anion, a bis tert butyldimethylsilylamide anion, and a trimethylsilyltrifluoromethylsilylamide anion.

In some embodiments, the amide anion is a symmetrical amide anion in which 2 functional groups bonded to N (anion center) are the same. Further, the Li salt may have an anionic component in an ionic liquid to be described later as an anionic component. Further, the Li salt may have an inorganic anion as an anionic component. The electrolytic solution in the present disclosure contains, for example, 1 kind of Li salts. In addition, the electrolytic solution in the present disclosure contains, for example, 2 or more kinds of Li salts.

The concentration of the Li salt in the electrolytic solution is, for example, 0.5 mol/L or more, and may be 2.5 mol/L or more, and may be 4 mol/L or more. On the other hand, the concentration of the Li salt in the electrolytic solution is, for example, 8 mol/L or less, and may be 6 mol/L or less.

2. F Salt

The F salt in the present disclosure contains at least F− as an anionic component. The F salt may contain only F− as an anionic component. On the other hand, the F salt may contain an anionic component other than F−. In some embodiments, the F salt contains F− as a main component of the anionic component. The ratio of F− to all anionic components in the F salt is, for example, 50 mol % or more, and may be 70 mol % or more, and may be 90 mol % or more.

The F salt has a cationic component. The F salt has, for example, an inorganic cation as a cationic component. Examples of the inorganic cation include a cation of an alkali metal. Examples of the alkali metal include Li, Na, K, Rb, and Cs. In some embodiments, the F salt contains at least K ions (K+) as a cationic component of the alkali metal. In the electrolytic solution, the ratio of KF to all F salts is, for example, 50 mol % or more, and may be 70 mol % or more, and may be 90 mol % or more. Note that the F salt may not contain Li as a cationic component of the alkali metal.

The F salt has, for example, an organic cation as a cationic component. Organic cations are cations with carbon (C) or nitrogen (N). Examples of the organic cation include tetraalkylammonium cations. Examples of the tetraalkylammonium cation include tetramethylammonium cations (TMA cations).

The electrolytic solution in the present disclosure contains, for example, 1 kind of F salts. In addition, the electrolytic solution in the present disclosure contains, for example, 2 or more kinds of F salts. In the electrolytic solution, at least a part of the F salt is dissolved in a solvent. In the electrolytic solution, all of the F salt may be dissolved in the solvent. In addition, in the electrolytic solution, a part of the F salt may not be dissolved in the solvent. Also, the Li salt and the F salt are salts having different compositions from each other.

The concentration of the F salt in the electrolytic solution is, for example, 0.1 mol/L or more, and may be 0.3 mol/L or more. On the other hand, the concentration of the F salt in the electrolytic solution is, for example, 6 mol/L or less, and may be 3 mol/L or less. The ratio (molar ratio) of the F salt to the Li salt is, for example, 0.02 or more, and may be 0.05 or more. On the other hand, the ratio (molar ratio) of the F salt to the Li salt is, for example, 1.5 or less, and may be 1.0 or less.

3. Trialkylphosphate

A trialkyl phosphate in the present disclosure is a phosphate ester in which 3 hydrogens (H) in phosphoric acid are substituted with an alkyl group. In some embodiments, the trialkyl phosphate is represented by the following general formula.

[Formula 2]

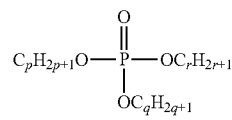

In formula 2, "p", "q" and "r" are each an integer of 1 or more and 10 or less. Each "p", "q" and "r", may be 8 or less, may be 5 or less, and may be 3 or less. If "p", "q" and "r" are too large, the viscosity of the electrolytic solution may be increased. When the viscosity of the electrolytic solution increases, the ionic conductivity tends to decrease. The values of "p", "q" and "r" may be the same.

The concentration of the trialkyl phosphate in the electrolytic solution is, for example, 0.3 mol/L or more, and may be 0.5 mol/L or more, and may be 1.0 mol/L or more. On the other hand, the concentration of trialkyl phosphate in the electrolytic solution is, for example, 6 mol/L or less, and may be 3 mol/L or less. The ratio (molar ratio) of trialkyl phosphate to Li salt is, for example, 0.1 or more, and may be 0.2 or more. On the other hand, the ratio (molar ratio) of trialkyl phosphate to Li salt is, for example, 1.5 or less, and may be 1.0 or less. In the electrolytic solution, the concentration (mol/L) of the trialkyl phosphate may be lower than the concentration (mol/L) of the Li salt. In the electrolytic solution, the concentration (mol/L) of the trialkyl phosphate may be higher than the concentration (mol/L) of the F salt.

4. Solvent

The electrolytic solution in the present disclosure usually contains a solvent. Examples of the solvent include glyme. In some embodiments, the glyme is represented by the following general formula.

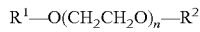  [Formula 3]

$R^1$ is an alkyl group having 4 or less carbon atoms or a fluoroalkyl group having 4 or less carbon atoms. $R^2$ is an alkyl group having 4 or less carbon atoms or a fluoroalkyl group having 4 or less carbon atoms. "n" is 2 or more and 10 or less.

In the above general formula 3, $R^1$ and $R^2$ may be the same or different. $R^1$ has 4, 3, 2 or 1 carbons. $R^2$ has 4, 3, 2 or 1 carbons. Examples of the alkyl group having 4 or less carbon atoms include a methyl group, an ethyl group, a propyl group, an isopropyl group, a butyl group, a sec-butyl group, an isobutyl group, and a tert-butyl group. A fluoroalkyl group is, for example, a group in which a hydrogen of a part of an alkyl group is substituted with fluorine. A fluoroalkyl group is, for example, a group in which all hydrogens of an alkyl group are substituted with fluorine.

In the above general formula, "n" is, for example, 3 or more. On the other hand, "n" is, for example, 8 or less, and may be 5 or less. The electrolytic solution contains, for example, 1 kind of glyme. In addition, the electrolytic solution contains, for example, 2 or more kinds of glyme.

Examples of the glyme include diethylene glycol diethyl ether, triethylene glycol dimethyl ether, tetraethylene glycol dimethyl ether, diethylene glycol dibutyl ether, diethylene glycol methylethyl ether, triethylene glycol methylethyl ether, and triethylene glycol butyl methyl ether.

Examples of the solvent used in the electrolytic solution include an ionic liquid and a nonaqueous solvent. The melting point of the ionic liquid is, for example, 100° C. or less. The melting point of the ionic liquid may be 50° C. or less, and may be 25° C. or less.

Examples of the cation of the ionic liquid include a piperidinium skeleton cation, a pyrrolidinium skeleton cation, an imidazolium skeleton cation, an ammonium cation, and a phosphonium cation.

Examples of the anion of the ionic liquid include amide anions such as bisfluorosulfonylamide (FSA) anion, bistrifluoromethanesulfonylamide (TFSA) anion, and the like; phosphate anions such as hexafluorophosphate anion, tris(pentafluoroethyl) trifluorophosphate anion; tetrafluoroborate (TFB) anion; and triflate anion.

The electrolytic solution contains, for example, 1 kind of ionic liquid. Further, the electrolytic solution contains, for example, 2 or more kinds of ionic liquids.

Examples of the nonaqueous solvent include ethylene carbonate (EC), fluoroethylene carbonate (FEC), difluoroethylene carbonate (DFEC), propylene carbonate (PC), dimethyl carbonate (DMC), diethyl carbonate (DEC), ethyl methyl carbonate (EMC), butylene carbonate (BC), γ-butyrolactone, sulfolane, acetonitrile, 1,2-dimethoxymethane, 1,3-dimethoxypropane, diethyl ether, tetrahydrofuran, 2-methyltetrahydrofuran, and dimethyl sulfoxide (DMSO).

The electrolytic solution contains, for example, 1 kind of nonaqueous solvents. Further, the electrolytic solution contains, for example, 2 or more kinds of nonaqueous solvents.

In the electrolytic solution, the ratio of glyme to all solvents is, for example, 10 mol % or more. The ratio of glyme is, for example, 30 mol % or more, may be 50 mol % or more, may be 70 mol % or more, and may be 90 mol % or more. In some embodiments, the solvent of the electrolytic solution consist of only glyme.

In some embodiments, the electrolytic solution in the present disclosure contains an Li salt, an F salt, a trialkyl phosphate and glyme. In some embodiments, the Li salt has an amide anion. In some embodiments, the F salt contains KF.

<Fluoride Ion Battery>

FIG. 1 is a schematic cross-sectional view illustrating a fluoride ion battery. The fluoride ion battery 10 shown in FIG. 1 has a cathode active material layer 1, an anode active material layer 2, an electrolyte layer 3, a cathode current collector 4, an anode current collector 5 and a battery case 6. The electrolyte layer 3 is formed between the cathode active material layer 1 and the anode active material layer 2. The cathode current collector 4 collects electricity from the cathode active material layer 1. The anode current collector 5 collects electricity from the anode active material layer 2. The electrolyte layer 3 contains the electrolytic solution described above.

Since the electrolyte layer contains the electrolytic solution described above, the fluoride ion battery has good reduction stability.

1. Electrolyte Layer

The electrolyte layer is formed between the cathode active material layer and the anode active material layer. The electrolyte layer contains the electrolytic solution described above. The thickness of the electrolyte layer is not particularly limited.

2. Cathode Active Material Layer

The cathode active material layer contains at least a cathode active material. The cathode active material layer may further contain at least one of a conductive material and a binder.

In the cathode active material, a defluorination reaction usually occurs during discharging. Examples of the cathode active material include simple metals, alloys, and metal oxides. The cathode active material may be a fluoride of a simple metal, a fluoride of alloys, or a fluoride of a metal oxide. The metallic elements contained in the cathode active material may be, for example, Cu, Ag, Ni, Co, Pb, Ce, Mn, Au, Pt, Rh, V, Os, Ru, Fe, Cr, Bi, Ni, Sb, Ti, Sn, Zn and the like. Further, examples of the cathode active material include a carbon material. Examples of the carbon material include graphite, coke, and carbon nanotubes. The cathode active material may be a fluoride of a carbon material. Further, examples of the cathode active material include a polymer material. Examples of the polymer material include polyaniline, polypyrrole, polyacetylene, and polythiophene. The cathode active material may be a fluoride of a polymer material.

Examples of the conductive material may include a carbon material. Examples of the carbon material include carbon black. Examples of the carbon black include acetylene black, Ketjen black, furnace black, and thermal black. Examples of the binder include a fluorine-based binder. Examples of the fluorine-based binder include polyvinylidene fluoride (PVDF) and polytetrafluoroethylene (PTFE).

3. Anode Active Material Layer

The anode active material layer contains at least an anode active material. The anode active material layer may further contain at least one of a conductive material and a binder.

In the anode active material, fluoridation usually occurs during discharging. The reaction potential of the anode active material is lower than the reaction potential of the cathode active material. Examples of the anode active material include simple metals, alloys, and metal oxides. The anode active material may be a fluoride of a simple metal, a fluoride of alloys, or a fluoride of a metal oxide. The metallic elements contained in the anode active material may be, for example, La, Ca, Al, Eu, Li, Si, Ge, Sn, In, V, Cd, Cr, Fe, Zn, Ga, Ti, Nb, Mn, Yb, Zr, Sm, Ce, Mg, Ba, Pb and the like. The anode active material may be the carbon material described above. In addition, the anode active material may be the polymer material described above. Further, the conductive material and the binder are the same as those described above.

4. Other Configurations

The fluoride ion battery has at least an anode active material layer, a cathode active material layer and an electrolyte layer. In some embodiments, the fluoride ion battery may have a cathode current collector for collecting electricity from the cathode active material layer. In some embodiments, the fluoride ion battery may have an anode current collector for collecting electricity from the anode active material layer. Further, the fluoride ion battery may have a separator between the cathode active material layer and the anode active material layer.

5. Fluoride Ion Battery

The fluoride ion battery may be a primary battery. The fluoride ion battery may be a secondary battery. The secondary battery can be charged and discharged repeatedly. Therefore, the secondary battery is useful as an on-board battery. Fluoride ion battery shapes include, for example, coin-type, laminate-type, cylindrical, and square-type.

EXAMPLES

In a glove box, an electrolytic solution was produced. The conditions of the glove box were as follows: the dew point was −100° C.; the oxygen concentration was 1 ppm or less; and the glove box had an argon atmosphere.

Example 1

Tetraglyme (tetraethylene glycol dimethyl ether, G4, KISHIDA CHEMICAL Co., Ltd.), lithium bisfluorosulfonylamide (LiFSA, KISHIDA CHEMICAL Co., Ltd.), potassium fluoride (KF, Alfa Aesar), and trimethyl phosphate (TMP, KISHIDA CHEMICAL Co., Ltd.) were added, to obtain a mixture. The concentration of LiFSA in the electrolytic solution was 4.5M. The concentration of KF in the electrolytic solution was 0.45M. The concentration of TMP in the electrolytic solution was 1.8M. In a sealed container made of fluororesin, an electrolytic solution was obtained by stirring the mixture. The stirring temperature was 30° C.

Comparative Example 1

An electrolytic solution was obtained in the same manner as in Example 1, except that TMP was not used.

[Evaluation]

The properties of the electrolytic solution were evaluated by cyclic voltammetry (CV). In the CV measurement, a dip-type three-electrode cell was used. As the working electrode, Al metal or Mg metal was used. As a counter electrode, an electrode containing polytetrafluoroethylene (PTFE), acetylene black (AB) and carbon fluoride (CF) was used (PTFE:AB:CF=1:2:7, by weight). The reference electrode was isolated from the electrolytic solution by refractory glass. Further, the reference electrode was an electrode in which Ag rays were immersed in an acetonitrile solution. The acetonitrile solution was a solution containing 0.1M of silver nitrate, 0.1M of tetrabutylammonium perchlorate, and acetonitrile.

Figure 2:
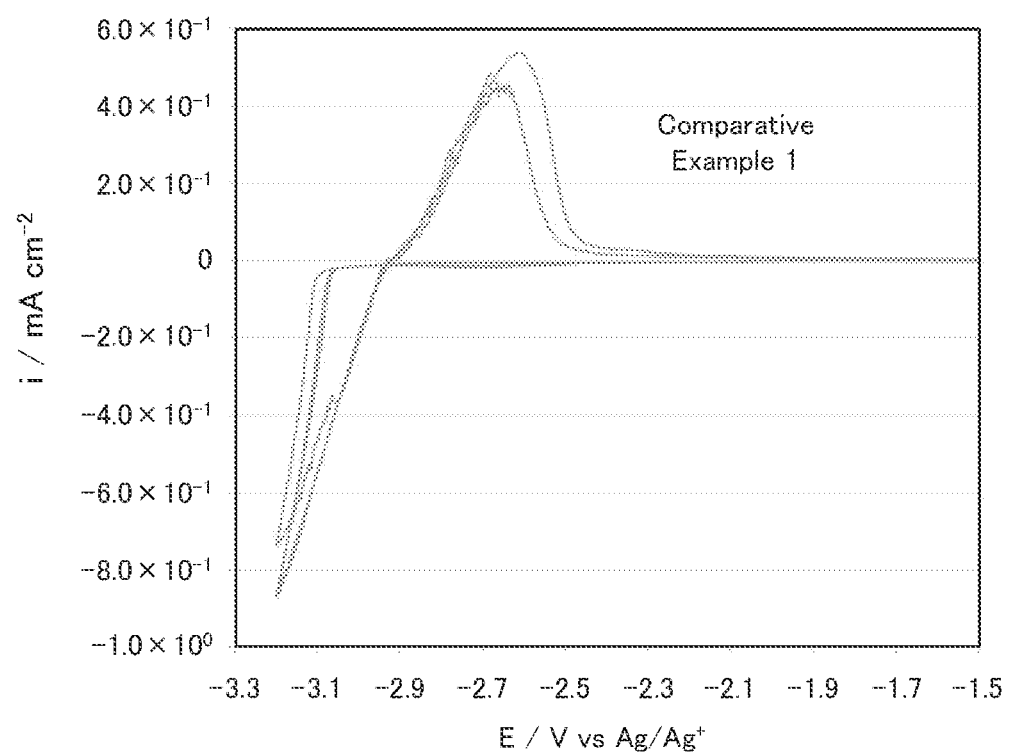
FIG. 2 is a graph showing the results of CV measurement in Comparative Example 1.

FIG. 2 shows the results of Comparative Example 1 using Al metal as the working electrode. As shown in FIG. 2, an oxidizing current was confirmed from about −2.9V (vs Ag/Ag+). Similarly, the reduction current was confirmed from about −2.9V (vs Ag/Ag+). On the other hand, the reaction potentials with respect to Li dissolution and Li deposition were measured. As a result, the reaction potential was −3.2V (vs Ag/Ag+). Further, the reaction potential of Al with Li is +0.3V (vs Li/Li+). Therefore, it is presumed that the oxidation current and the reduction current are caused by the reaction between Al and Li, i.e., the alloying reaction and the de-alloying reaction. In other words, in the electrolytic solution of Comparative Example 1 (electrolytic solution containing no trialkyl phosphate), it was confirmed that the activity of Li+ was higher than that of F−.

Figure 3:
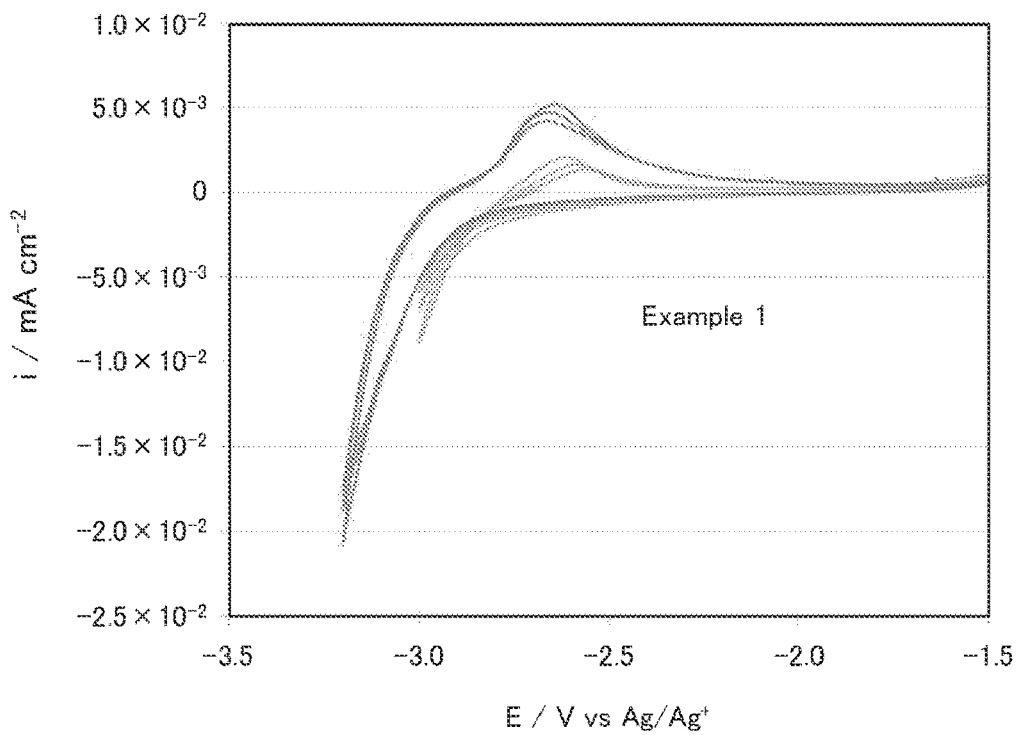
FIG. 3 is a graph showing the results of CV measurement in Example 1.

FIG. 3 shows the results of Example 1 using Mg metal as the working electrode. FIG. 3 shows the results when the lower limit of the sweep range is −3.2V (vs Ag/Ag+) and when the lower limit of the sweep range is −3.0V (vs Ag/Ag+). As shown in FIG. 3, an increase in reduction current was observed from −2.8V (vs Ag/Ag+). This reaction is presumed to be a defluorination reaction of $MgF_2$ or an Li-alloying reaction of Mg. On the other hand, peaks of the oxidizing current were observed in the vicinity of −2.6V (vs Ag/Ag+). This peak is the peak derived from the fluoridation reaction of Mg. A slight increase in the oxidizing current was observed in the vicinity of −3.0V (vs Ag/Ag+). As described above, the reaction potential with respect to Li dissolution and Li deposition is −3.2V (vs Ag/Ag+). The reaction potential between Mg and Li is +0.2V (vs Li/Li+). Therefore, it is inferred that the peak near −3.0V (vs Ag/Ag+) is a peak derived from the delithiation reaction of LiMg. In other words, in the electrolytic solution of Example 1 (electrolytic solution containing trialkyl phosphate), it was confirmed that the activity of F− was higher than that of Li+.

Figure 4:
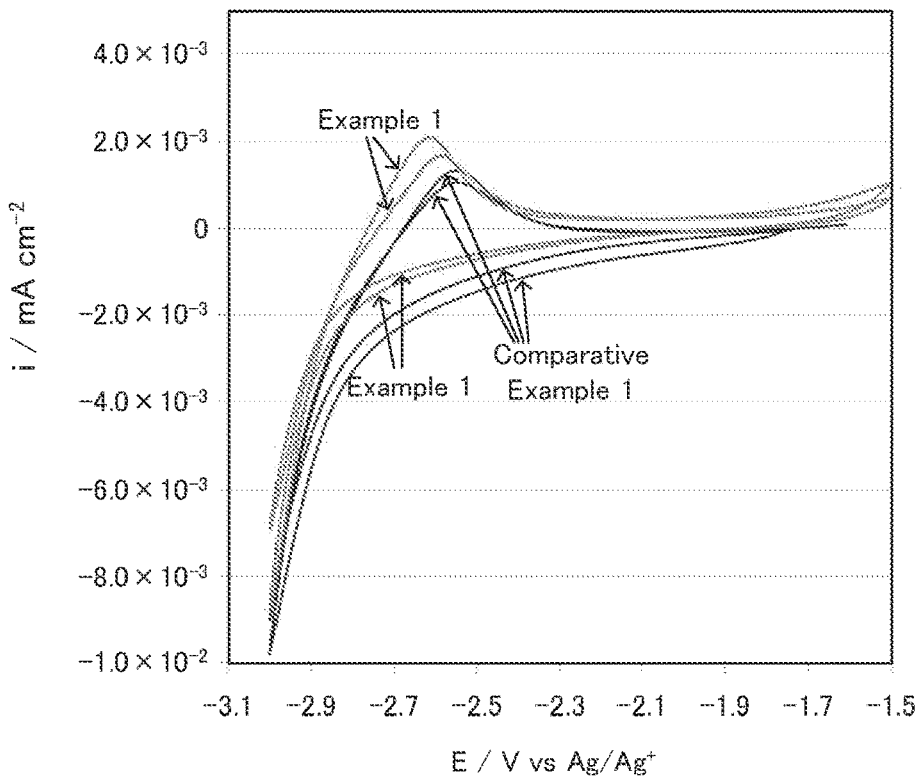
FIG. 4 is a graph showing the results of CV measurement in Example 1 and Comparative Example 1.

FIG. 4 shows the results of Example 1 and Comparative Example 1 using Mg metal as the working electrode. As shown in FIG. 4, in Example 1 and Comparative Example 1, peaks of the oxidizing current were confirmed in the vicinity of −2.6V (vs Ag/Ag+). In Comparative Example 1, a reduction current was observed from −1.7V (vs Ag/Ag+). In contrast, in Example 1, a reduction current was observed from −2.0V (vs Ag/Ag+). That is, the reduction stability of the electrolytic solution was improved by adding trialkyl phosphate. In Comparative Example 1, when the cycle of reduction and oxidation was repeated, the reduction current increased. On the other hand, in Example 1, when the cycle of reduction and oxidation was repeated, the reduction current decreased.

Figure 5:
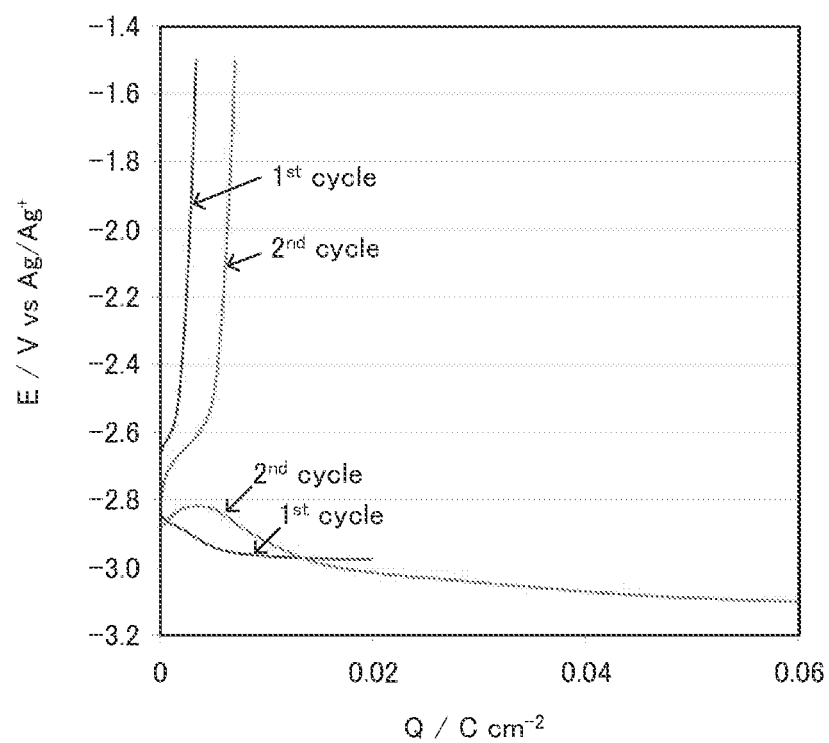
FIG. 5 is a graph showing a charge/discharge curve using the electrolytic solution of Example 1.

FIG. 5 is a charge/discharge curve using the electrolytic solution of Example 1, in which Mg metal was used as the working electrode. As shown in FIG. 5, the fluorination reaction of Mg and the defluorination reaction of $MgF_2$ were confirmed. Further, from 3.0V (vs Ag/Ag+), Li-alloying of Mg proceeds. In 2nd cycle, the battery was charged to a potential lower than −3.0V (vs Ag/Ag+), but the discharging current associated therewith was not confirmed. In addition, in 2nd cycle, the capacity accompanied by the defluorination reaction (reaction in the vicinity of −2.9V) of $MgF_2$ at the time of charging almost agreed with the capacity at the time of discharging. Therefore, it was confirmed that by using trialkyl phosphate, side reactions derived from Li+ were suppressed, and as a result, reduction stability was improved.

DESCRIPTION OF SYMBOLS

1 . . . Cathode active material layer
2 . . . Anode active material layer
3 . . . Electrolyte layer
4 . . . Cathode current collector
5 . . . Anode current collector
6 . . . Battery case
10 . . . Fluoride ion battery

What is claimed is:

1. An electrolytic solution comprising:
a solvent comprising 50 mol % or more of a glyme;
an Li salt containing an amide anion;
a F salt containing a cation of an alkali metal that is not Li; and
a trialkyl phosphate following general formula

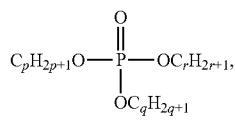

wherein "p", "q" and "r" in the general formula are each an integer of 1 or more and 10 or less,
wherein:
a concentration of the Li salt in the electrolytic solution is 2.5 mol/L or more and 6 mol/L or less;
a concentration of the F salt in the electrolytic solution is 0.1 mol/L or more and 3 mol/L or less; and
a concentration of the trialkyl phosphate in the electrolytic solution is 0.5 mol/L or more and 3 mol/L or less.

2. The electrolytic solution of claim 1, wherein:
the trialkyl phosphate is trimethyl phosphate;
the F salt contains at least K ions;
the amide ion of the Li salt comprises a sulfonylamide anion.

3. The electrolytic solution of claim 2, wherein a molar ratio of the F salt to the Li salt is 0.02 or more and 1.5 or less.

4. The electrolytic solution of claim 2, wherein a molar ratio of the trialkyl phosphate to the Li salt is 0.1 or more and 1.5 or less.

5. The electrolytic solution of claim 2, wherein the solvent of the electrolytic solution comprises 90 mol % or more of the glyme.

6. The electrolytic solution of claim 2, wherein the glyme is tetraethylene glycol dimethyl ether.

7. A fluoride ion battery comprising a cathode active material layer, an anode active material layer, and an electrolyte layer formed between the cathode active material layer and the anode active material layer, wherein;
the electrolyte layer contains the electrolytic solution according to claim 1;
the cathode active material layer comprises a cathode active material;
the anode active material layer comprises an anode active material; and
at least one of the cathode active material or the anode active material comprises a fluoride of a simple metal, a fluoride of an alloy, or a fluoride of a metal oxide.

8. The fluoride ion battery of claim 7, wherein:
the trialkyl phosphate is trimethyl phosphate;
the F salt contains at least K ions;
the amide ion of the Li salt comprises a sulfonylamide anion.

9. The fluoride ion battery of claim 8, wherein a molar ratio of the F salt to the Li salt is 0.02 or more and 1.5 or less.

10. The fluoride ion battery of claim 8, wherein a molar ratio of the trialkyl phosphate to the Li salt is 0.1 or more and 1.5 or less.

11. The fluoride ion battery of claim 8, wherein the solvent of the electrolytic solution comprises 90 mol % or more of the glyme.

12. The fluoride ion battery of claim 8, wherein the glyme is tetraethylene glycol dimethyl ether.

* * * * *